SKEW CORRECTION IN A RECORDING AND REPRODUCING SYSTEM

Filed Dec. 9, 1960

INVENTOR:
John T. Mullin
By Smyth, Roston & Pavitt
Attorneys.

June 16, 1964 J. T. MULLIN 3,137,768

SKEW CORRECTION IN A RECORDING AND REPRODUCING SYSTEM

Filed Dec. 9, 1960 2 Sheets-Sheet 2

INVENTOR:
John T. Mullin
By Smyth, Roston & Pavitt
Attorneys.

United States Patent Office 3,137,768

Patented June 16, 1964

3,137,768
SKEW CORRECTION IN A RECORDING AND REPRODUCING SYSTEM

John T. Mullin, Beverly Hills, Calif., assignor to Minnesota Mining and Manufacturing Company, St. Paul, Minn., a corporation of Delaware Filed Dec. 9, 1960, Ser. No. 75,463
11 Claims. (Cl. 178—6.6)

This invention relates to recording and reproducing systems and, more particularly, to such systems capable of recording and reproducing signals over a wide frequency range such as, for example, video signals.

Conventional apparatus for recording video information is either magnetic tape equipment or photographic equipment. At first photographic equipment was utilized even though it had many disadvantages because the tape equipment at reasonable tape speeds was limited with respect to its usable frequency range. The video image was recorded as successive frames in accordance with conventional motion film techniques. Magnetic tape recording equipment has, however, been developed for transversely recording and reproducing signals covering a relatively wide frequency range across a magnetic tape. This transverse recording equipment is, in the main, the equipment currently utilized for recording video information.

One such transverse recording equipment utilizes a rotary magnetic head assembly provided with magnetic units arranged to sweep successively across a relatively wide magnetic tape. While such equipment is workable, it is subject to a number of important disadvantages. For example, while a fineness of detail can be recorded and reproduced in the direction of the rotation of the high speed magnetic heads, detail in the direction of motion of the tape is very poor. The detail is poor because of the finite width of the head structure and because the successive transverse tracks must be separated by a few thousandths of an inch to avoid crosstalk between tracks. Another disadvantage is that the high speed rotating heads must be very accurately controlled by high grade servo systems to maintain synchronization and low flutter. Further, editing of the tape is difficult because the operator cannot view the picture by inspecting the surface of the tape.

In my copending patent application Serial No. 75,464 filed on Dec. 9, 1960, (D–1568) these disadvantages are overcome utilizing a transverse recording and reproducing system capable of handling high grade picture information. High speed mechanical devices are not utilized and instead high speed electronic devices are provided, such as cathode ray tubes and flying spot scanners for the recording and reproducing functions. A strip of continuously moving photographic film functions as the recording medium.

The video signals to be recorded, which are of the type conventional in the United States comprising a succession of horizontal line scans, are frequency modulated on a carrier and the modulated carrier is first rectangularized and then introduced to the cathode ray tube for recording. The direction of the modulation is such as to provide higher frequencies for the darker portions of the images represented by the video signals. Gamma and gray scale problems usually associated with film are nonexistent because there are only two states of the cathode ray tube current, on and off. A typical recorded line, on examination under a microscope consists of a series of alternate dark and light dashes, the duration of which changes with the video information. The successive transverse lines may be recorded quite close together and an observer can view and edit the recorded film.

In the specific illustrative embodiment of this invention, a recording and reproducing system of the general type disclosed in the above-identified copending patent application is provided. Means are provided in the recording equipment for coding the successive transverse lines both at the beginning and end of each line. The scanning cycle of the cathode ray tube provides for an extended recording interval and for a shortened flyback interval. The recorded signals on the film strip are arranged in the three longitudinal areas, a central relatively wide area for the frequency modulated video signals and two side areas for the coded signals.

The coded signals are utilized for two purposes: first, to synchronize the scanning means of the reproducing equipment with the transverse lines across the film strip so that the scanning is along the centers of the successive transverse lines or tracks; and second, to compensate for any misalignment or angular variation in the position of the film strip relative to the scanning means which is referred to as skew. Both of these functions are highly desirable because they reduce crosstalk between the closely packed transverse lines on the recording medium. Crosstalk is a term utilized to indicate distortion or interference due to the reproduction of signals recorded on adjacent tracks.

Features of this invention relate to the provision of means for coding groups of three transverse tracks and for monitoring the coding of the central one of each of the three successive tracks. If the coding of the end track adjacent the central track is reproduced in the form of crosstalk, the synchronization between the movement of the film strip and the scanning means is adjusted in accordance therewith.

Further features of this invention relate to aligning the scanning means to provide for a predetermined amount of skew. The scanning means may be a flying spot scanner having horizontal and vertical deflection means with the horizontal deflection providing for the transverse movement of the beam across the film strip. Adjustable means are provided for deflecting the beam vertically as it is moved horizontally to compensate for the predetermined amount of skew and for any other skew present due to any misalignment of the film strip. The adjustable means is synchronized with the horizontal deflection means and controlled by the coded signals at the beginning and end of the successive transverse lines.

Further advantages and features of this invention will become apparent upon consideration of the following description when read in conjunction with the drawing wherein.

Figure 1:
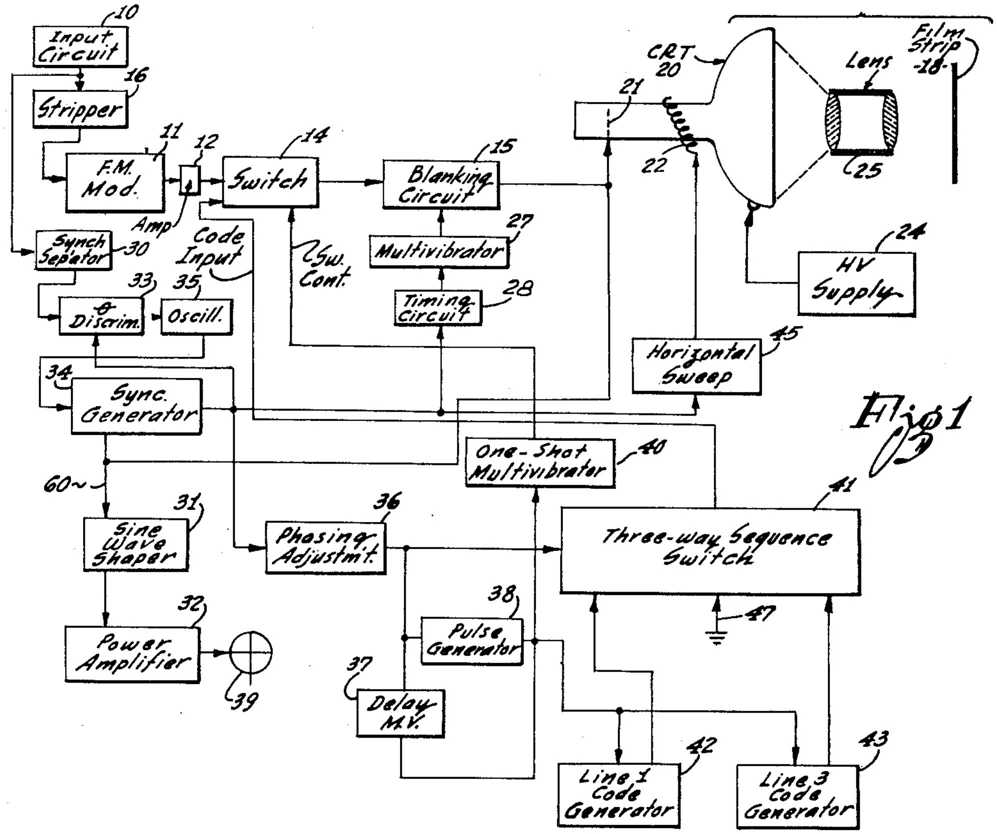
FIGURE 1 is a functional representation of the recording apparatus of the recording and reproducing system of this invention.

Referring first to FIGURE 1, which shows the recording apparatus of this invention, the signals to be recorded may be conventional video signals provided by a video input circuit 10. The conventional television signal in the United States includes 525 horizontal lines at a repetition rate of 15,750 lines per second for each frame, and the repetition rate of the frames is 30 frames per second. The video signals may also include horizontal and vertical synchronization pulses.

The video signals from the circuit 10 are provided to a conventional type stripper circuit 16 which removes the synchronization pulses and passes only the video information itself to a frequency modulator 11 for modulating a carrier. The modulator may include a high frequency adjustable oscillator providing for a modulated signal illustratively having a bandwidth from 4.2 to 6.8 megacycles. The direction of the modulation may be such as to provide the higher frequencies for the darker portions of the images represented by the video signals. The frequency modulated signal from the modulator 11 is introduced to a circuit 12 which rectangularizes the individual pulses of the frequency modulated carrier. Illustratively, the circuit 12 may be a Schmidt trigger circuit which operates in one direction when the carrier increases to a predetermined value and which operates in the other direction when the carrier decreases to a predetermined value. The circuit 12 may also be an overdriven amplifier which rectangularizes the frequency modulated signal. The output of the circuit 12, accordingly, is a series of rectangular or flat top pulses having a duration which varies in accordance with the video signals from the input circuit 10.

The rectangularized, frequency modulated carrier from the circuit 12 is provided through a switch 14 and a blanking circuit 15, both of which are hereinafter described, to the grid 21 of a cathode ray tube 20. As is also hereinafter described, the switch 14 and the circuit 15 are operated to pass the modulated signal from the amplifier 12 during the time the video information is provided therefrom. The cathode ray tube 20 is utilized to record the frequency modulated video signals on a strip of film 18. The signal to the grid 21 of the cathode ray tube 20 consists of a series of pulses of varying lengths depending upon the frequency modulation or the video information. The beam in the cathode ray tube 20 is, therefore, turned on and off in accordance with the successive pulses from the circuit 12.

The horizontal movement of the beam in the cathode ray tube 20 is synchronized with the video signals provided from the input circuit 10 so that a horizontal line of the cathode ray tube 20 is initiated somewhat before the beginning of a horizontal line of the video signals. As is hereinafter described, the beginning and termination portions of each recorded line are utilized for coding functions. As is also hereinafter described in reference to FIGURE 2, coded signals are utilized during the reproducing sequence for correcting any skew and for synchronizing the reproducing equipment to read exactly along the recorded lines or tracks on the film strip 18.

Referring again now to FIGURE 1, a conventional type horizontal synchronizing pulse separator 30 may be utilized to separate the horizontal synchronizing pulses of the video input signals from the circuit 10. The horizontal synchronizing pulses are provided from the separator 30 to a phase discriminator 23 which compares the phase of these pulses with the phase of pulses provided from a generator 34. Any difference in phase between the two sets of pulses provides for an error signal at the output of the phase discriminator 33 which is introduced to a variable oscillator 35. The oscillator 35 may include a reactance tube, not shown, or other means for varying the frequency of the oscillator in accordance with the error signal from the phase discriminator 33. The frequency of the oscillator 35, accordingly, varies in accordance with the error signal provided thereto so as to be directly in step with the horizontal synchronizing pulses of the video signals. The signal from the oscillator 35 is provided to the generator 34 so that the generator 34 is driven in step and in phase with the horizontal synchronizing pulses of the video input signal.

The pulses from the pulse generator 34 are provided to a horizontal sweep circuit 45 which controls the deflection of the beam across the face of the tube 20. The sweep pulses are provided to a deflection coil 22 at the tube 20, and a high voltage supply 24 may be connected to the anode of the tube 20. Vertical deflection is unnecessary because the film strip 18 is moving. The image on the face of the cathode ray tube 20 is provided line by line through a lens system 25 to the moving strip of recording film 18. The film 18 may be driven by a conventional film drive 39 (at the bottom left of FIGURE 1) to move at a relatively constant velocity so that line after line of the video signals are recorded on the film strip 18 due to its own motion. The speed of the film strip 18 determines the spacing between the successive horizontal video lines. The lines are recorded transversely across the film strip 18 in a direction substantially perpendicular to its direction of motion.

The present invention is not restricted to photographic recording techniques as, for example, thermoplastic recording techniques may be utilized for recording the video and audio signals. When thermoplastic recording is provided, an electron beam in a flying spot scanner is used instead of a cathode ray tube as the transducing or recording means. The specific illustrative embodiment is, accordingly, merely illustrative.

The movement of the film strip 18 by the film drive motor 39 is synchronized with the input video signals provided from the input circuit 10. The generator 34, in addition to providing the synchronizing pulses at a nominal repetition rate of 15,750 pulses per second, also provides vertical synchronizing pulses at a nominal repetition rate of 60 pulses per second. The repetition rate of the vertical synchronizing pulses is 60 per second. The repetition rate of the vertical synchronizing pulses is 60 per second instead of 30 per second frame repetition rate because, as is conventional in the U.S., two interlaced fields are provided for each frame. The 60 cycle pulses from the generator 34 are provided to a shaping circuit 31 and therefrom to a power amplifier 32. The power amplifier 32 controls the speed of the film drive motor 39. The motor 39 may drive the film strip 18 by any conventional arrangement as by utilizing film sprocket equipment or by capstan means, etc.

Figure 3:
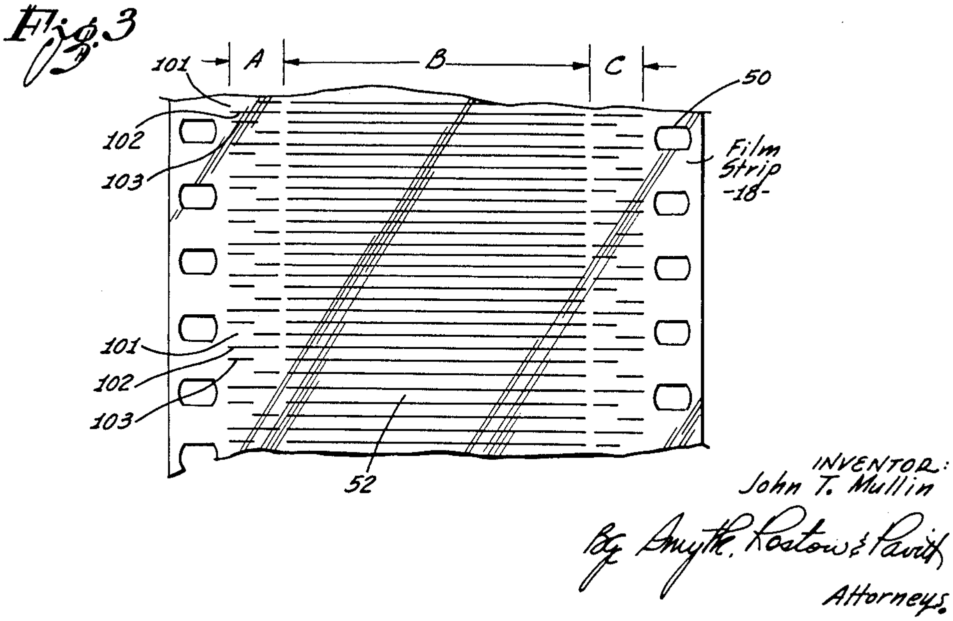
FIGURE 3 is a fragmentary view of the film strip utilized in the recording and reproducing system of this invention illustrating the disposition and synchronization of the recorded coding and video signals.

As shown in FIGURE 3, the film strip 18 includes three longitudinal areas A, B and C for recording signals and a series of sprocket holes 50 which may be used for drawing the film strip 18. The central area B is utilized for recording the frequency modulated video signals provided from the modulator 11 to the cathode ray tube 20. The two longitudinal areas A and C respectively at the beginning and at the end of the transversely recorded lines or tracks are utilized for the coding signals briefly mentioned above.

In FIGURE 3, the longitudinal spacing of the lines 52 in the area B, and the lines in areas A and C as well, is exaggerated as the lines are actually much closer together and seem to blend one into another to an observer. For example, if the length of each track or line 52 is 1.5 inches, the 525 lines forming a video frame may occupy $3/4\times3/2=1\frac{1}{8}$ inches or have a density of approximately 466 lines per inch. The lines 52, accordingly, form a fairly dense grating of light and dark dashes of varying lengths which together form the video image. The image may be viewed by projecting light at an angle along the lines 52. The resulting interference pattern is a visible image of the video image represented by the video signals. The interference pattern causes the closer spaced dots or dashes in each line to seem to blend together. As indicated above, the closer spaced dots represent darker portions of the images. The successive fields of the video signals are in this manner recorded on the film strip 18, field by field, with a separation therebetween due to the vertical blanking interval in the signals between successive fields.

The duration of a horizontal line in conventional television signals is 63.5 microseconds and the horizontal blanking interval occupies approximately 16 percent or 10 microseconds of the 63.5 microseconds. In this manner, approximately 53.5 microseconds of each of the horizontal lines is utilized for the frequency modulated signals provided from the modulator 11 through the switch 14 and blanking circuit 15 to the control grid 21 of the cathode ray tube 20. The switch 14 is a two-condition switch which is set in one condition to pass the frequency modulated signals during this 53.5 microsecond interval of each horizontal line. During the coding intervals at the beginning and end of each track, which intervals are represented by the areas A and C in FIGURE 3, the switch 14 is set to its other condition to pass signals provided through a three-way sequence switch 41.

The sequence switch 41 may be a ring counter or the like which is controlled by the horizontal synchronizing pulses provided from the generator 34 through a phasing adjustment circuit 36. The phasing adjustment circuit 36 may be a delay circuit for delaying the operation of the sequence switch 41 such that it operates at the beginning of the area A on the film strip 18. Illustratively, the recording of the coded signals in the areas A may take two microseconds and recording of the recorded signals in the area C may also take two microseconds. The duration for recording each entire transverse track or line across all three areas A, B and C is then 53.5 plus 4 microseconds or 57.5 microseconds. The remaining duration of each horizontal line which is 6 microseconds is utilized for retrace during which time the beam in the cathode ray tube 20 is blanked. The beam is blanked by the blanking circuit 15 which is operated by a multivibrator 27. The multivibrator 27, which may have an operating duration of 6 microseconds, is triggered by a timing circuit or delay 28 coupled to the generator 34. The circuit 28 delays the successive horizontal sync pulses for an interval such that the blanking circuit 15 is operated during the retrace time of 6 microseconds for each horizontal line.

The switch 41, mentioned above, is a three-way sequence switch which successively and cyclically connects a code generator 42, a ground connection 47 and a code generator 43 to one of the two inputs of the switch 14. The coding signals provided to the switch 14 are, in this manner, changed cyclically during each three successive lines or transverse tracks recorded across the film strip 18. When the code generator 42 is operated, it provides a pulse during the second half of the two pulse coding interval recorded across the area A. As shown in FIGURE 3, at 101, the coding consists of a blank and then a pulse for the code generator 42. When the sequence switch 41 couples the ground connection to the switch 14, the coding, as indicated at 102 in FIGURE 3, consists of a recorded pulse in both halves of the code intervals. The code generator 43 provides a pulse during the first half and not during the second half as indicated at 103 in FIGURE 3.

The code generators 42 and 43 are operated by a pulse generator 38 coupled to the output of the circuit 36. In this manner, each time that the sequence switch 41 is stepped, the code generators 42 and 43 are operated. The code generator 43 is operated at the same time as the code generator 42 so that, depending upon the position of the sequence switch 41, one of the three different code inputs is coupled through the switch 41 and through the switch 14 to the cathode ray tube 20. The sequence is cyclically repeated in three steps due to the operation of the switch 41. During the first step, the code generator 42 is effective to record in the area A of the strip 18; during the second step the ground connection 47 is effective; and during the third step the code generator 43 is effective. The sequence is continued throughout the recording operation of the apparatus shown in FIGURE 1.

A similar sequence takes place at the end of each transverse track across the film strip 18 in the coding area C. A delay multivibrator 37 is operated by the circuit 36 to reoperate the code generators 42 and 43 during this last 2 microsecond interval of each transverse track. Depending upon the position of the sequence switch 41, the coded signals are provided during this latter interval of the transverse tracks as well as the initial interval of the tracks. The coding is, accordingly, the same at the beginning of each transverse track in the area A and at the end of each transverse track in the area C. The width of the areas A and C in FIGURE 3 is somewhat exaggerated in order to more clearly indicate the coding. Actually, the two pulses each would be small spots or dashes on the film strip 18.

The switch 14 is operated to its second condition to pass pulses provided through the sequence switch 41 under control of a multivibrator 40. The multivibrator 40 is connected to the output of both the pulse generator 38 and the delay multivibrator 37. The multivibrator 40 may have an operating duration of 2 microseconds which is the recording interval for each of the 2 sets of coding signals in the respective areas A and C. The multivibrator 40 is operated first at the beginning of each transverse line by the generator 38 and then again toward the end of each transverse line by the delay multivibrator 37. The switch 14 is, accordingly, set to its second condition to pass the coding signals through the sequence switch 41 during the first two microseconds and during the last 2 microseconds of each transverse track. The switch 14 is reset to its first condition when the multivibrator 40 returns to its normal condition.

Figure 2:
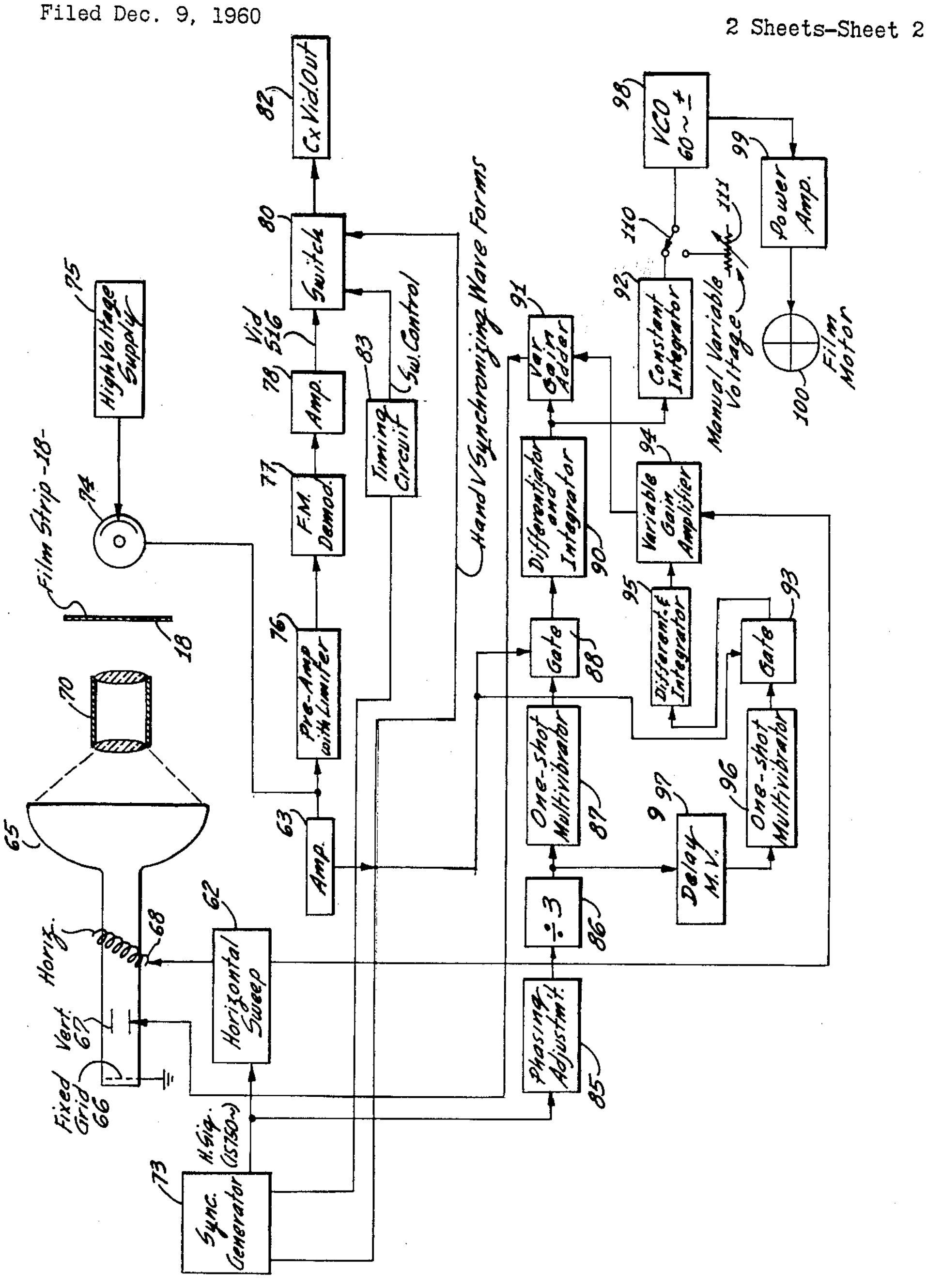
FIGURE 2 is a functional representation of the reproducing apparatus of the recording and reproducing system of this invention.

The video signals recorded on the film strip 18 may be reproduced by the apparatus depicted in FIGURE 2. As shown in FIGURE 2, a flying spot scanner 65 is utilized for reproducing the signals recorded on the film strip 18. The flying spot scanner 65 scans the film strip 18 by means of a lens system 70, with the moving spot providing an image of the recorded signals to a photocell 74. The beam is moved transversely in the scanner 65 by a horizontal deflection coil 68 controlled by a sweep circuit 62. The sweep circuit 62 is, in turn, driven by a synchronizing generator 73 which provides a horizontal synchronizing signal of 15,750 cycles per second. The synchronizing generator 73 may be an accurate pulse source including, for example, a crystal unit, not shown. The control grid 66 of the scanner 65 may be connected to ground, and a pair of vertical deflection plates 67 may be provided for controlling the exact position of the beam longitudinally with respect to the film strip 18. As is hereinafter described, the vertical deflection in the tube 65 is controlled to correct for any skew between the transverse recorded tracks and the horizontal deflection of the beam in the cathode ray tube 65.

The photocell 74 may be energized by a high voltage supply 75 and the signals from the photocell 74 are coupled through a preamplifier 76 having a limiting circuit means to a frequency demodulator 77. The demodulated signals are provided through an amplifier 78 to a switch 80. As is hereinafter described, the switch 80 is enabled to pass the demodulation video signals during the 53.5 microsecond interval corresponding to the recording area B in FIGURE 3. The signals through the switch 80 are provided to an output circuit 82. The horizontal and vertical synchronizing pulses are provided through the switch 80 from the synchronizing generator 73, when the switch 80 is in its second condition. The switch 80 is controlled by a timing circuit or delay multivibrator 83 driven from the synchronizing generator 73. The timing circuit 83 sets the switch 80 to its first condition during the time the video signals are provided to the switch 80 and to its second condition for the rest of each horizontal line. The circuit 83 may also include means for maintaining the switch 80 in its second condition for the vertical synchronizing pulses. The composite signal provided to the video output circuit 80, accordingly, includes both the demodulated video signals and the synchronizing pulses.

As indicated above, the coded signals are utilized for both maintaining the beam in the scanner 65 directly in synchronization with the transverse recorded tracks and also for correcting any skew between the transverse tracks and the horizontal deflection of the beam in the scanner 65. The reproduced signals at the photocell 74 are also provided through an amplifier 63 to the input of two gates 88 and 93. The gate 88 is enabled for a brief period under control of a one shot multivibrator 87, and the gate 93 is enabled for a brief period under control of a one shot multivibrator 96. The one shot multivibrator 87 is triggered toward the beginning of every third transverse track on the strip 18, and the multivibrator 96 is triggered toward the end of every third transverse track on the film strip 18. A delay multivibrator 97 is utilized for spacing the operation of the two multivibrators 87 and 96 to provide for this operation. The multivibrators 87 and 96 are controlled by the synchronizing generator 73 which provides the horizontal synchronizing pulses through a phasing adjustment or delay circuit 85 to a frequency divider 86. The frequency divider may provide one pulse for each three pulses provided thereto.

The phasing adjustment circuit 85 provides a delay so that the multivibrator 87 operates just after the beginning of the transverse track. The gate 88 is, accordingly, enabled sometime during the first half of the coding interval corresponding to the area A in FIGURE 3. The gate 88 is not enabled before the beginning of the coding interval but just after its commencement. The gate 93 similarly is operated just after the beginning of the coding interval corresponding with the area C in FIGURE 3. The gate 88 closes before the end of the coding interval corresponding to area A at the beginning of the transverse track, and the gate 93 closes before the end of the coding interval corresponding to area C at the end of the transverse track. As indicated above, these gates (88 and 93) are enabled for each third transverse track due to the operation of the frequency divider 86.

The signals coupled through the gate 88 are first differentiated and then the differentiated pulses are integrated in a differentiator 90. The integration may be of a number of transverse tracks to provide an averaged signal. The signals provided through the gate 88 depend upon which one of the three different coded signals (101, 102 and 103) are provided. As described above, the coding is cyclically changed for each three successive transverse tracks with the coding being illustrated at 101 through 103 in FIGURE 3. If the transverse track having the coding indicated at 102, that is a pulse being recorded in both halves of the coding interval, is provided through the gate 88, a differentiated pulse is not developed. If the coded signals indicated at 101 are provided, a positive differentiating pulse is developed and if the coded signals indicated at 103 are provided, a negative differentiating pulse is developed. Depending, therefore, upon the coding either a positive or a negative differentiated pulse is generated or no pulse at all is developed.

As is hereinafter described, the speed of the film strip 18 is adjusted by the signals from the circuit 90 in a direction such that no differentiated pulses are provided through the gate 88. If the scanner 65 is reading directly on the line having a pulse in both halves of the recording area A at the time the one shot multivibrator 87 is operated, a correction is not provided to a film drive motor 100 for adjusting the speed of the film strip 18. As long as the scanner 65 remains in exact synchronization with the film strip 18 such that the coded signals provided through the gate 88 do not develop any differentiating pulses, the speed of the film drive motor 100 is not varied. If, however, differentiating pulses are developed, an error signal is generated for adjusting the speed of the motor 100. The signals from the circuit 90 are coupled through another integrator 92 which further averages them through a switch 110 to a voltage controlled oscillator 98. The oscillator 98 is connected to a power amplifier 99 which drives the film motor 100. The speed of the motor 100 is, in this manner, adjusted in accordance with the error signal provided from the circuit 90. The switch 110 may be set for manual adjustment of the motor 100 under control of a potentiometer 111 if such adjustment is desired.

The scanner 65 is, in this manner, locked directly to read on the transverse tracks. Actually, the amount of desynchronization determined by the apparatus may be smaller than the distance between adjacent transverse tracks. In other words, the system corrects for even small variations from reading directly along the center of a transverse track. The correction is provided because the magnitude as well as the polarity of the differentiated pulses at the circuit 90 vary in accordance with the relative position between the scanning beam in the scanner 65 and the transverse track on the film strip 18. When the beam is somewhat between two transverse tracks, it develops a differentiated pulse of relatively small magnitude due to crosstalk or reading the coded signals of the track adjacent to the central track (102) of each three coded tracks. If the variation is such that the beam is directly on one of the adjacent tracks (101, 103), the magnitude of the differentiating signal is relatively large. Due to the crosstalk effect, the differentiating pulses, accordingly, vary in magnitude as well as polarity with the magnitude indicating the degree of de-synchronization and the polarity indicating the direction of de-synchronization.

As indicated above, in addition to correcting for any de-synchronization between the scanner 65 and the successive transverse tracks, the apparatus shown in FIGURE 2 also functions to correct for any skew. The scanner 65 is normally positioned or oriented to provide for a predetermined minimum amount of skew with respect to the movement of the beam due to the horizontal sweep signals alone and the alignment of the transverse tracks on the film strip 18. This skew is corrected for by the provision of a varying signal to the vertical deflection plates 67 of the scanner 65. The signal provided to the vertical deflection plates 67 is developed from the horizontal sweep signals at the sweep circuit 62. In other words, as the beam is swept horizontally due to the signal to the coil 68, its vertical position is simultaneously adjusted due to a signal provided to the plates 67. On the film strip 18 the beam sweeps transversely due to the horizontal deflection and longitudinally to correct for the skew due to the vertical deflection.

The horizontal sweep signal is provided from the circuit 62 to a variable gain amplifier 94. The gain of the amplifier 94 is controlled by a differentiating and integrating circuit 95 which may be similar to the circuit 90 described above. The circuit 95 functions to differentiate and integrate the signal coupled through the gate 93 also mentioned above. The gate 93 is enabled during the second coding interval toward the end of each third transverse track and corresponding to the area C in FIGURE 3. If the scanning beam is directly on the central track (102) of each three tracks at the end of the track at area C, the gain of the amplifier 94 is not adjusted. If the beam is not directly at the center of the central track, the gain of the amplifier 94 is either increased or decreased in accordance therewith. The rise of the sweep voltage, accordingly, is varied in accordance with the position of the scanning beam relative to the end of the transverse track.

The adjusted signal from the amplifier 94 is coupled to an adding circuit 91. The output of the circuit 90 is also provided to the adding circuit 91. The output of the circuit 91 is effectively a D.C. voltage, which is provided by the circuit 91 directly to the vertical deflection plates 67. The D.C. voltage causes the entire line scanned by the tube 65 to be shifted vertically upward or downward as required by the line tracking. The reason for providing the D.C. voltage to the plates 67 is that the motor control system, including the oscillator 98 and amplifier 99, merely averages the speed of the film over a sizable fraction of a second. Incremental changes in film speed due to flutter and wow in the mechanical system necessitate additional correction, and this is provided by introducing the D.C. voltage from the circuit 90 to the plates 67.

The signal provided to the vertical deflection plates 67 from the adding circuit is exactly of a value to compensate for the skew due to canting the scanner 65 with respect to the transverse tracks on the film 18. If any additional skew is present, however, due to movements of the film 18 during recording or reproducing, the signals provided from the variable gain amplifier change to correct the skew. Assume for example, that the beam is directly on the center line at the beginning of a transverse track and between two transverse tracks at the end of the transverse tracks. For such a condition, the circuit 90 does not provide for an adjustment but the amplifier 94 does, so that the vertical deflection signal compensates for the skew. The beam, in this manner, is not only maintained in synchronization being locked to the center of the successive transverse tracks, but it is also maintained directly along this track due to the automatic skew correction feature.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A recording and reproducing system for use with a recording medium movable in a first direction, including, means operatively coupled to the recording medium for obtaining a movement of the medium in the first direction, means disposed relative to the medium for recording information as line scan signals in successive transverse tracks across the recording medium in a second direction transverse to the first direction, means operatively coupled to the recording means for obtaining a recording of coding signals at each end of each transverse track on the recording medium with the coding signal at the beginning and end of each one of every three successive tracks being different from the coding signals at the beginning and end of the other two tracks, means disposed relative to the medium for reproducing the coding signals and the line-scan signals recorded on the moving medium, means coupled to said reproducing means for separating the reproduced coding signals from the reproduced line-scan signals, means responsive to the coding signals from the separating means at the beginning of a particular one of every three successive tracks for varying the speed of the recording medium past the reproducing means, and means responsive to the coding signals at the end of the particular one of every three successive tracks for varying the skew of the tracks relative to the reproducing means.

2. In a recording and reproducing system for use with a recording medium movable in a first direction, line scan recording means disposed relative to the medium for recording information signals line-by-line on said recording medium in a second direction transverse to the first direction and for recording control signals in a particular pattern at the end of each line on the medium, means operatively coupled to the medium for establishing relative motion between said recording medium and said recording means in the first direction, line-scan reproducing means positioned relative to said recording medium for reproducing the information and control signals recorded in the lines on the recording medium, said reproducing means having an adjustable deflection arrangement for adjusting the direction of scanning each line in the transverse direction to compensate for any skew between the recorded lines and the reproducing means, means operatively coupled to the medium for establishing relative motion between said reproducing means and said recording medium in the first direction, means coupled to said reproducing means for separating the control signals reproduced from the end of the lines recorded on said recording medium from the information signals recorded in the lines, and control means coupled to said separating means and responsive to the control signals for adjusting the deflection arrangement of said reproducing means relative to the lines of information signals on the medium.

3. In a recording system for use with a recording medium movable in a first direction to record information represented by line scan signals in a second direction transverse to the first direction, a source of signals of carrier frequency, means coupled to the source for frequency modulating the line scan signals on the carrier frequency, means coupled to the modulating means for rectangularizing the frequency modulated signals from said modulating means to provide a series of pulses variable in duration in accordance with the frequency modulation of the line scan signals, means operatively coupled to the medium for moving said medium at a constant speed in the first direction, line scanning means positioned relative to the recording medium and coupled to said rectangularizing means for recording the series of pulses in a succession of transverse tracks in the second direction on the recording medium, a source of code signals, output means including the line scanning means and coupled to the source of code signals for recording the code signals on at least one end of each of the transverse tracks on the recording medium, and control means operatively coupled to the source of code signals for varying the pattern of the code signals on a cyclic basis in accordance with the recording of successive tracks in the transverse direction to distinguish the successive tracks from one another, the output means being coupled to the code means to obtain the recording of the code signals on the successive tracks in the cyclic pattern.

4. In a recording and reproducing system for use with a recording medium movable in a first direction to record line scan signals in a succession of tracks in a second direction transverse to the first direction and to reproduce such signals from the tracks, means operatively coupled to the medium for obtaining a movement of the medium in the first direction, means synchronized with the line scan signals for developing control signals concurrently with the production of successive tracks of the line scan signals and for developing the control signals in a particular pattern on a cyclic basis for the successive tracks to distinguish the successive tracks from one another, means positioned relative to the recording medium for recording each track of the line scan signals and the concurrently produced control signals as a single transverse track in the second direction on the recording medium, line scanning means positioned relative to the recording medium for reproducing the line scan signals and the control signals from each transverse track on the recording medium, means coupled to the line scanning means for sampling the reproduced control signals at a particular repetition rate related to the rate of reproduction of the control signals, said line scanning means including adjustable deflecting means providing for a component of the scanning of the line scanning means in the first direction as well as in the second direction and providing for adjustments in the component of the scanning in the first direction in accordance with adjustments in the operation of the deflecting means, and control means coupled to said deflecting means for varying the component of the scanning in the first direction in accordance with the pattern of the sampled control signals to maintain the positioning of said line scanning means on the tracks on the recording medium.

5. In a recording and reproducing system in accordance with claim 4 wherein said control means includes a source of deflection signals and coupled to said deflecting means for obtaining a scanning in the second direction on the recording medium, variable gain amplifier means coupled to said source and to said deflecting means for varying the component of the scanning in the first direction in accordance with the gain of the amplifier means during the scanning in the second direction, and means coupled to said amplifier means for varying the gain of said amplifier means in accordance with the pattern of the control signals reproduced from the recording medium.

6. In a system for reproducing information recorded in a first direction as line scan signals in transverse tracks on a recording medium movable in a second direction transverse to the first direction and for reproducing control signals recorded in a particular pattern at the ends of the successive tracks to distinguish the successive tracks from one another, drive means operatively coupled to the medium for obtaining a movement of the medium in the second direction, line scanning means positioned relative to the recording medium for reproducing the line scan signals and the control signals recorded in the transverse tracks in the second direction on the medium, means operatively coupled to the line scanning means for operating said line scanning means at a constant line repetition rate, analyzing means coupled to the line scanning means for developing a control signal having a pattern in accordance with the pattern of the reproduced control signals and in accordance with any desynchronization between the line scanning means and the transverse tracks, means coupled to the analyzing means and the drive means for obtaining variations in the speed of the recording medium in accordance with variations in the pattern of the control signals developed by the analyzing means to obtain a synchronization between the operation of the line scanning means and the presentation of the transverse tracks to the line scanning means, and means coupled to the analyzing means for varying the disposition of each of the successive tracks relative to the line scanning means in the first direction in accordance with variations in the pattern of the control signals at the other end of the transverse tracks to minimize any skew of the recording medium relative to the scanning means.

7. In a system for reproducing information recorded in a first direction as line scan signals in transverse tracks on a recording medium movable in a second direction transverse to the first direction and for reproducing control signals recorded at the ends of the transverse tracks in a pattern to distinguish the successive tracks from one another, means operatively coupled to the medium for obtaining a movement of the medium in the second direction, line scanning means adjustably positioned relative to the recording medium for reproducing the line scan signals and the control signals recorded in the transverse tracks, means coupled to the line scanning means for separating the control signals from the reproduced line scan signals, analyzing means responsive to the control signals for providing an indication of any misalignment between the direction of the scanning by said line scanning means and the orientation of the transverse tracks on the recording medium in accordance with the pattern of the control signals, and means coupled to the analyzing means for adjusting the position of the line scanning means relative to the recording medium to vary the scanning direction in accordance with the pattern of the control signals from said analyzing means.

8. In a recording and reproducing system for use with a recording medium movable in a first direction to record line scan signals on the medium in tracks in a second direction transverse to the first direction and to reproduce such signals from the medium, means operatively coupled to the medium for obtaining a movement of the medium in the first direction, recording means disposed relative to the medium for recording the line scan signals in the successive tracks in the second direction on the recording medium, means operatively coupled to the recording means for recording coding signals at one end of each transverse track on the recording medium with the coding signals for each one of the adjacent tracks being different in a particular repetitive pattern, reproducing means including a flying spot scanner disposed relative to the medium for scanning the line scan signals and the coding signals recorded in the successive tracks on the recording medium and for developing signals in accordance therewith, operating means operatively coupled to the reproducing means for operating said scanner at a particular line repetition rate, means coupled to said scanner for sampling the reproduced coding signals from a particular track in each particular repetitive pattern, means synchronized with said operating means for operating said sampling means at a particular fraction of the line repetition rate of said flying spot scanner dependent upon the number of tracks in each particular repetitive pattern, and means coupled to said sampling means and responsive to the sampled signals for varying the movement of said recording medium with respect to said scanner to obtain a synchronization between the movement of the recording medium and the sampling of the coding signals in the particular track of each particular repetitive pattern.

9. A recording and reproducing system in accordance with claim 8, including in addition, means operatively coupled to the recording means for obtaining a recording of the coded signals at the other end of each transverse track with the coded signals at each end of the track being the same, said flying spot scanner including adjustable deflection means providing for an adjustable component of the scanning in the first direction in accordance with variations in the characteristics of the sampled control signals means and providing for a component of the scanning in the second direction, said sampling means including means for sampling the reproduced coded signals from both ends of the particular track in each particular repetitive pattern, and means coupled to said sampling means for varying the operation of the deflection means in accordance with variations in the characteristics of the sampled control signals to maintain said line scanning means positioned on the transverse tracks.

10. In a recording and reproducing system for use with a recording medium movable in a first direction to record line scan signals on the medium in a second direction transverse to the first direction and to reproduce such signals from the medium, drive means operatively coupled to the medium for obtaining a movement of the medium in the first direction, means disposed relative to the medium for recording the line scan signals in successive transverse tracks in the second direction on the recording medium, means operatively coupled to the recording means for obtaining a recording of coding signals at one end of each transverse track on the recording medium with the coding signals for each one of the successive tracks being different in a particular repetitive pattern, means disposed relative to the medium for reproducing the coding signals and the line scan signals recorded on the moving recording medium, means coupled to the reproducing means for operating said reproducing means at a fixed line repetition rate, means coupled to the reproducing means for sampling the reproduced coding signals at a fixed repetition rate which is a particular fraction of the rate of the line repetition rate of said reproducing means dependent upon the number of tracks in each particular repetitive pattern, whereby the pattern of sampled signals is indicative of the synchronization between the operation of the reproducing means and the movement of the recording medium in the first direction, means coupled to said reproducing means and to said sampling means for operating said sampling means in synchronization with said reproducing means at the particular fraction of the repetition rate of the reproducing means, and means responsive to the sampled signals and operatively coupled to the drive means for obtaining variations in the speed of the recording medium in a direction to compensate for any de-synchronization indicated by the sampled signals.

11. A reproducing system for information signals recorded in transverse tracks in a first direction on a recording medium movable in a second direction transverse to the first direction and for control signals recorded at the ends of the transverse tracks in a particular repetitive pattern for the successive tracks, means operatively coupled to the medium for obtaining a movement of the medium in the second direction, line scanning means disposed relative to the medium for scanning the recording medium in the first direction on the recording medium and for providing signals in accordance therewith, said line scanning means having adjustable means for varying the angle of scanning in the first direction with respect to the second direction in accordance with adjustments in the operation of the adjustable means, means coupled to said scanning means and responsive to the signals provided by said scanning means for synchronizing the line scan repetition rate with the movements of the recording medium to initiate the scanning of each transverse track by said line scanning means on a particular one of the recorded tracks in the second direction, and means coupled to said scanning means and responsive to the signals provided by said scanning means for adjusting the operation of said adjustable means to maintain the scan on the track being scanned during the scanning of the track.

References Cited in the file of this patent

UNITED STATES PATENTS

| | | |
|---|---|---|
| 2,851,521 | Clapp | Sept. 9, 1958 |
| 2,876,295 | Irby | Mar. 3, 1959 |
| 2,890,277 | Duke | June 9, 1959 |
| 2,900,444 | Camras | Aug. 18, 1959 |
| 2,937,239 | Garber et al. | May 17, 1960 |

OTHER REFERENCES

RCA TN, No. 256, June 1959.